United States Patent [19]

Lemelson

[11] Patent Number: 4,578,717
[45] Date of Patent: Mar. 25, 1986

[54] MAGNETIC RECORD CARD TRANSDUCING APPARATUS AND METHOD

[76] Inventor: Jerome H. Lemelson, 48 Parkside Dr., Princeton, N.J. 08540

[21] Appl. No.: 405,996

[22] Filed: Aug. 6, 1982

Related U.S. Application Data

[63] Continuation-in-part of Ser. No. 379,517, May 18, 1982, which is a continuation-in-part of Ser. No. 158,286, Jun. 10, 1980.

[51] Int. Cl.[4] .......................... G11B 5/004; G11B 5/80
[52] U.S. Cl. .......................................... 360/2; 360/100; 360/84; 360/87; 360/72.2; 360/101; 360/107
[58] Field of Search .................... 360/2, 84, 87, 35.1, 360/101, 107, 72.2; 358/102

[56] References Cited

U.S. PATENT DOCUMENTS

| | | | |
|---|---|---|---|
| 2,710,191 | 6/1955 | Williams | 274/4 |
| 2,812,948 | 11/1957 | Roberts | 274/4 |
| 3,275,328 | 9/1966 | Varga | 360/87 |
| 3,286,033 | 11/1966 | Lemelson | 179/6 |
| 3,925,815 | 12/1975 | Lemelson | 360/14 |
| 3,964,095 | 6/1976 | Kihara et al. | 360/81 |
| 4,084,198 | 4/1978 | Lemelson | 360/33 |

FOREIGN PATENT DOCUMENTS 54-64455  6/1980  Japan .................................... 360/2
157172  12/1980  Japan .

*Primary Examiner*—Robert L. Richardson

[57] ABSTRACT

A magnetic recording and reproduction apparatus are provided employing a flat, flexible magnetic record member, such as a plastic sheet or card coated with or containing a magnetic recording material and having parallel closely spaced record tracks. In one form, a flexible record card is arcuately deformed into the configuration of a cylinder or a partial cylinder and one or more magnetic transducers are caused to scan a selected circular track of the card and to record on and/or reproduce from the selected track. Rapid relative axial movement between the arcuately deformed card and the transducer is effected until the transducer becomes aligned with a selected track of the card, whereupon transducing is automatically effected for scanning at least a selected portion of such selected track. In a particular form, the selected track is attained by scanning marker recordings provided along, aligned with or between respective of the parallel tracks and generating pulse signals which are fed to an electronic counter. When a selected count of such signals is made, a control signal is generated by the counter, which signal is employed to controllably operate the transducer and/or its movement into engagement of the selected track of the card.

20 Claims, 5 Drawing Figures

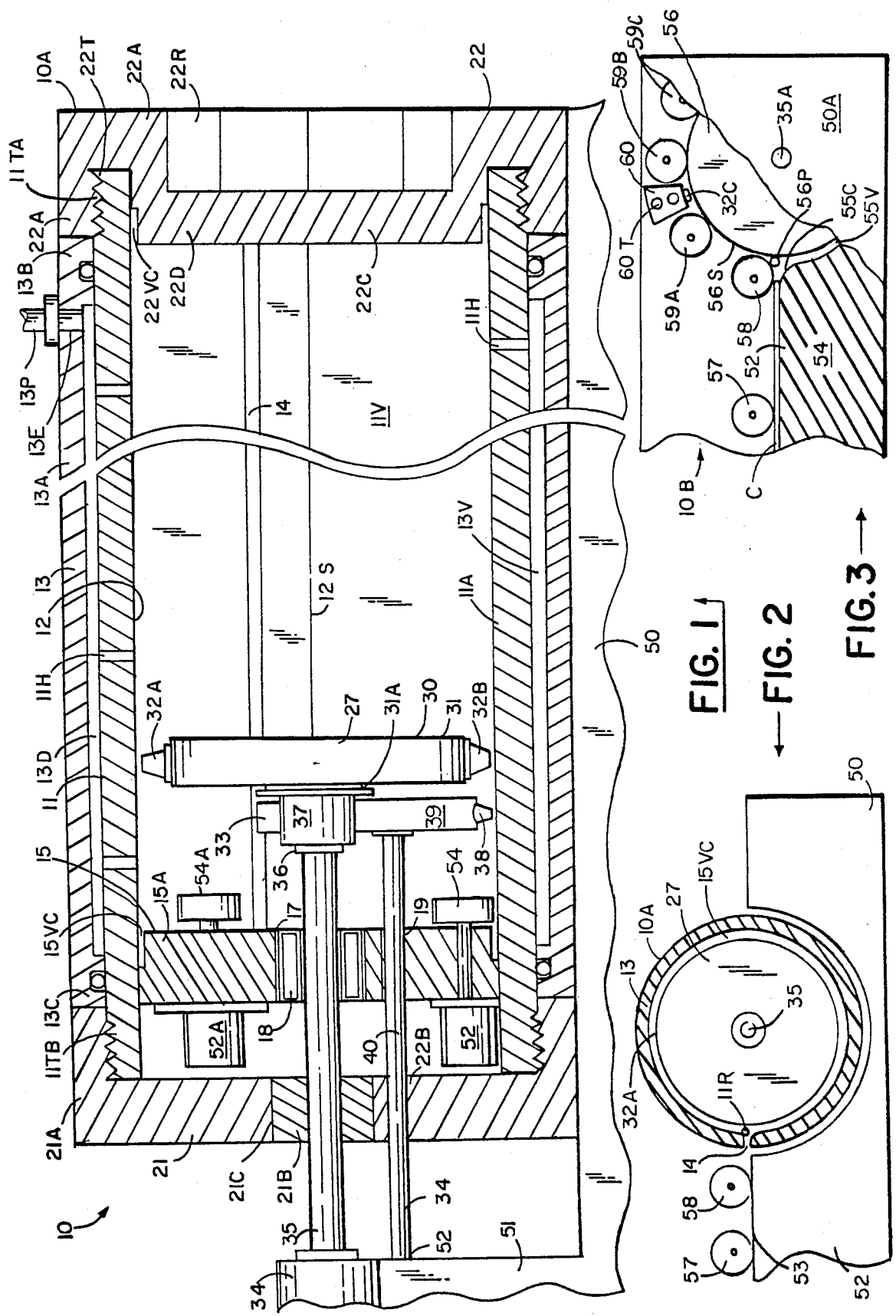

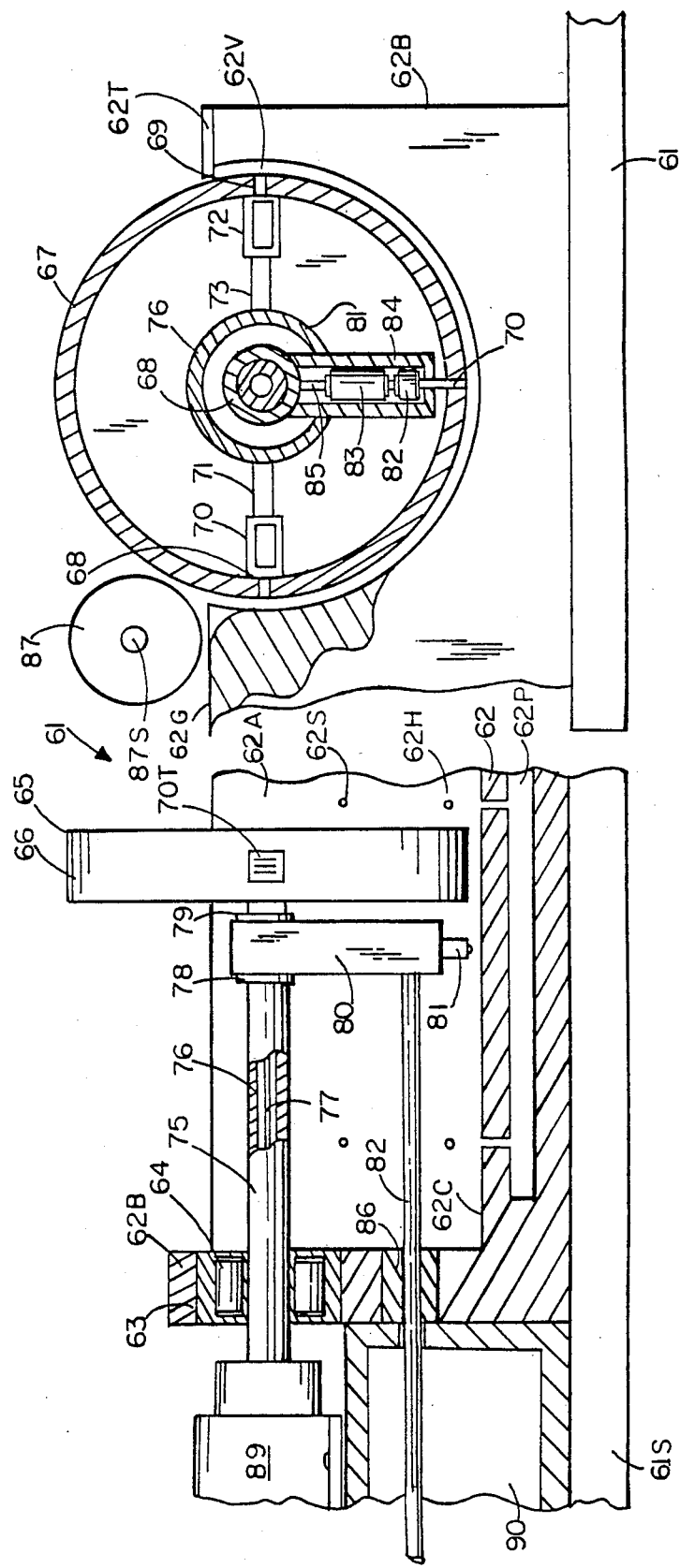

MAGNETIC RECORD CARD TRANSDUCING APPARATUS AND METHOD

RELATED APPLICATIONS

This is a continuation-in-part of application Ser. No. 379,517 filed on May 18, 1982 and entitled Magnetic Recording Apparatus and Method which is a continuation-in-part of application Ser. No. 158,286 filed June 10, 1980.

SUMMARY OF THE INVENTION

This invention relates to an apparatus and method for transducing information with respect to selected tracks of a magnetic record card while the card is in a cylindrical or partial cylindrical configuration and the parallel tracks thereof are circularly configured. Rapid relative axial movement between the card and the transducing means is effected to attain a selected track so as to reduce access time.

It is known in the art to magnetically transduce with respect to parallel tracks of a magnetic record card, reference being made to my U.S. Pat. Nos. 3,434,130; 3,818,500; 3,803,350 and 3,943,563.

The instant invention provides improvements in the apparatus and methods of the prior art for effecting such transducing as the recording of signals defining selected information along selected tracks of a multiple parallel track magnetic record card. Improved access time and recording density are effected by the apparatus and methods disclosed herein so as to increase the versatility and applications of the system disclosed.

In my co-pending application Ser. No. 379,517 improvements are provided in the structures and recording arrangements of magnetic record cards, such as flexible, "floppy" plastic record cards or sheets coated with or containing magnetic recording material and it is intended to utilize such card structures and recording arrangements in the instant application wherein the cards are made to conform to a cylindrical or partial cylindrical support during a transducing operation and either the support is rotated at high speed or one or more transducers are rotated while magnetic coupling is effected between the transducing means and the cylindrically deformed card, particularly when a selected circular track thereof is in alignment with the transducing means, so as to effect a recording or reproduction operation with respect to either an entire circular track or a selected portion of a selected track of the card. By providing for on-the-fly scanning as the selected circular track of the card is scanned by the transducing means, access time is minimized and access to any selected frame or recording location of a card may be attained in less than a second. By providing marker recordings aligned with respective of the parallel tracks of the record card and scanning such recordings with a lineally movable transducer which axially moves with a rotating or rotatable transducer for transducing primary information but does not rotate therewith, precise attainment of a selected track of the card may be effected by means of computer or manually generated track frame selection signals.

Accordingly it is a primary object of this invention to provide a new and improved apparatus and method for transducing information with respect to selected portions of the magnetic record card.

Another object is to provide an apparatus and method for selectively recording selected frame information along selected portions of a magnetic record card and rapidly reproducing selected portions of the recorded information for use by a computer or for the display thereof on an electronic display screen such as a cathode ray tube.

Another object is to provide a new and improved magnetic record card transducing apparatus wherein transducing is effected while such card is in a cylindrically deformed configuration.

Another object is to provide a new and improved document or page storage and retrieval system capable of recording and reproducing document information including graphical or picture information and rapidly accessing or retrieving selected documents and displaying same for human monitoring.

Another object is to provide magnetic record card transducing apparatus and method employing relatively thin magnetic record cards which may be produced at low cost and which may be easily made to conform to a cylindrical configuration to permit relatively rapid transducing to be effected when the record cards are cylindrically deformed.

Another object is to provide a magnetic transducing arrangement employing flexible magnetic record cards and an apparatus for receiving and cylindrically deforming such record cards prior to a transducing operation relative thereto.

With the above and such other objects in view as may hereinafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

BRIEF DESCRIPTION OF THE DRAWINGS

FIG. 1 is a side view with parts broken away for clarity of a magnetic transducing apparatus employing a rotating transducing arrangement disposed within a cylindrically deformed magnetic record card.

FIG. 2 is an end view with parts broken away of an apparatus of the type shown in of FIG. 1.

FIG. 3 is an end view with parts broken away of a modified form of magnetic card transducing apparatus.

FIG. 4 is a side view with parts broken away for clarity of another modified form of the invention employing means for deforming a magnetic record member in the configuration of a semicylinder.

FIG. 5 is an end view of FIG. 4 with parts broken away.

In FIGS. 1 and 2 there is shown details of a first form of the invention defining a magnetic card transducing apparatus for performing either or both of the functions of selectively recording information along selected record tracks of a magnetic record card and/or selectively reproducing information recorded along selected record tracks of a similar card while such card is arcuately deformed and disposed within a cylindrical bore or chamber of a housing containing a rotatable magnetic transducer or a number of such transducers adapted to be power rotated about the longitudinal axis of the cylindrical bore against which the card is arcuately deformed.

The electromechanical assembly 10 includes a housing 11 supported on a base 50 which also supports a rotary and axial drive for a shaft 35, at the end of which is supported a discshaped housing 27 within the cylindrical volume or bore 11V defined by housing 11. Surrounding and secured to the exterior surface of housing 11 is a second cylindrical housing or jacket 13 containing a cylindrical cavity or recess portion 13D defined by the central portion 13A of the wall of jacket 13 and supported a distance away from the central portion 11A of housing 11, thereby providing a volume 13V between jacket 13 and wall 11, which volume may be evacuated of air when a record card is disposed arcuately deformed within housing 11 adjacent the interior surface 12 thereof. Such vacuum may be effected by means of a suitable source of vacuum pressure, such as a vacuum pump or vacuum chamber connected through a tube 13P to a radial passageway 13E extending through wall portion 13A wherein the negative pressure is applied at a select time during an operating cycle so as to cause the flexible magnetic card to abut and conform to the shape of the cylindrical inside surface 12.

Secured to and closing off the ends of housing 11 are respective cup-shaped closures 21 and 22. Closure 21 has a cylindrical side wall 21A which is internally threaded to engage threads 11TB formed at the end of housing 11. A lineal bearing or bushing 21B is retained within a central cylindrical opening or bore 21C in the end wall 21 and the bearing supports shaft 35 for rotational and lineal movement therein. Shaft 35 is supported by an upward extension 51 of the supporting base 50 which also supports a table portion 52 containing an upper surface 53 extending to one side of the housing 11, preferably in a plane which passes through the axis of rotation of shaft 35 to permit a record card to be driven along surface 53 by powered rollers 57 and 58 disposed above surface 53 and supported by table 52 when an elongated slotted opening 14 extending through the side wall of housing 11 and jacket 13, is aligned with the upper surface 53 of table 52 as illustrated in FIG. 2. An elongated rod 11R located just inside housing 11 and extending between the end walls thereof guides the flexible record card in a downwardly direction, together with auxiliary guide means to be described, against the inside surface 12 before suction is applied to draw such card against said surface.

Closure 22 at the other end of housing 11 has its cylindrical side wall 22A internally threaded with threads 22T adapted to engage threads 11TA formed in the outer surface at the other end of housing 11. The central portion of end wall 22B of the closure 22 contains a recess or cavity 22R defined by a side wall which is shaped to permit a suitable tool or wrench to be inserted therein and to grip the flat side wall portions thereof to permit the closure to be turned and tightened against the end of the cylindrical housing 11 as illustrated. Notation 22C refers to a central portion of closure 22 which is thus inserted into the interior volume 11V of housing 11 and which contains an inwardly stepped portion 22D which provides an annular cylindrical volume 22VC with the adjacent inside cylindrical surface of the side wall 11, which volume serves to guide the end of the flexible magnetic record card after it is inserted through opening 14, into close proximity with the inside cylindrical surface 12 while the other end of the flexible record card is similarly guided by an annular cylindrical volume 15VC formed in a stepped portion of a disc-shaped support 15 which is secured within housing 11 by means of one or more threaded fasteners retaining it against the inside surface 12 of wall 11 a distance away from the end wall of the closure 21. Stepped portion 15A of disc-shaped support 15 is thus substantially similar in shape and diameter to the central portion 22D of the end wall 22C of closure 22 and the two annular volumes 15VC and 22VC thus provide respective guideways for guiding the left and right borders of the flexible magnetic card driven through opening 14 to guide the card in a cylindrical path against the surface 12. When the flexible magnetic card is inserted to its full-insertion position within the housing 11 as defined, for example, by a stop or step 12S in the inside surface 12 of the wall 11, vacuum pressure may be automatically applied through line 13P to the opening 11H in wall 11, thereby drawing the flexible card tightly against the inside surface 12.

Secured within a bore 15B which extends axially through the center of the disc-shaped support 15, is a precision bearing 16 which supports shaft 35 for axial and rotational movement therein. Depending on the design of bearings 16 and 21B, either or both may be employed to the exclusion of the other and the one which is utilized is sufficient to rotationally and axially support shaft 35 during its longitudinal and rotational movement through the interior volume 11V of housing 11. Also shown supported by the disc-shaped support 15 are a plurality of motors, two of which, denoted 52B and 52A, are shown and are operable to power rotate respective drive wheels 54 and 54A secured to the ends of the respective motor shafts and are positioned thereby to frictionally engage the inside surface of a flexible record card which is positioned adjacent the surface 12 of the wall 11 to drive such record card through the housing and to permit the entire card or a select portion thereof to be disposed against the inside surface 12 of wall 11 and to conform thereto per se or when vacuum is applied to the openings 11H. It is also noted that the disc-shaped housing 31 at the end of shaft 35 may be normally disposed at the center of housing 11 and may contain one or more solenoid or fluid cylinder projectable friction elements adapted to engage a record card where it is inserted into the opening 14 and to drive such record card in a cylindrical path adjacent surface 12 until it is fully inserted, thereby eliminating the need for such motors as 52B, 52A, etc.

The transducer support assembly 27 includes a hollow cylindrical disc-shaped housing 31 forming an assembly 30 which includes one or more radially movable magnetic transducers, such as magnetic recording and/or reproduction heads which are respectively movable along radial tracks or guides disposed within or formed in the interior surface of the housing 31. Such magnetic heads are connected to externally located circuits and a source of electrical energy by means of wire supported within one or more cables extending radially through housing 31 to a passageway extending through shaft 35 and are connected to such external source of power and circuitry by means of suitable brush-slip ring commutating means or other signal and energy coupling means. Details of means for supporting, projecting and retracting the magnetic transducers 32A and 32B into and out of engagement with a cylindrically deformed record card disposed within housing 11 are illustrated in FIGS. 4 and 5 and will be described hereafter. Such magnetic heads 32A and 32B are normally retained retracted wherein their operating ends are normally disposed a short distance away from a cylindrically deformed magnetic record card disposed against surface 12 when the heads become aligned with a selected track of a cylindrical deformed card within housing 11, they are automatically projected radially against the inside recording surface of the magnetic record card to permit them to effect scanning of the selected track. In another form, the disc assembly 30 is continuously rotated while it is moved axially and its transducers effect scanning of selected tracks on-the-fly as they come into alignment with each track.

A number of means and methods may be employed to attain alignment of the magnetic head or heads 32A and 32B with a selected track of a cylindrically deformed record card disposed against surface 12. In one such method, pulses are generated with incremental longitudinal movement of shaft 35 through the housing 11 either by counting marker recordings provided along shaft 35 by photoelectrically or magnetically scanning such recordings or by sensing and detecting marker recordings provided laterally along a record card between or along the parallel tracks thereof. As illustrated in FIG. 1, a magnetic transducer 38 is supported on an elongated mount 39 adjacent disc 31, which mount does not rotate with the rotation of such disc. Magnetic pickup transducer and its mount 39 are kept from rotating by being supported by a collar 37 containing a precision roller bearing which permits shaft 35 to rotate therein without rotating mount 39. A second shaft 19 is secured at its end to mount 39, passes through axial bores 19 and 22B in support 15 and end wall 21 and is adapted to pass through a lineal bushing 52 extending through mount 51. Shaft 34 thus maintains mount 39 circumferentially fixed within the housing 11 as shaft 35 rotates but movable axially with the axial movement of shaft 35 due to the fact that collar 37 supporting shaft 39 is retained by a collar or stepped portion 36 of shaft 35 against the central portion 31A of housing 31. Collar 36 and the central portion 31A preferably engage their central portion of the roller bearing supported within collar or base 37 while the rollers and outer portion of such bearing rotate thereon so as to confine friction to the rolling engagement of the rollers in the bearing race. Notation 18 refers to a bearing disposed within bore 17 for rotationally and axially supporting shaft 35.

As a result of the means for supporting mount 39 against rotation, magnetic pickup 38 is axially fixed with respect to shaft 35, and may be employed to scan marks or recordings extending along or between the parallel tracks of a magnetic record card as shaft 35 moves axially through the housing with or without rotation of assembly 27 and such scanning results in the generation of pulse signals which may be counted in an electronic counter which, upon uncounting or attaining a predetermined count, may generate a control signal for triggering the initiation of a number of functions including the operation of one or more solenoids advancing the retracted magnetic heads 32A and 32B into engagement or operative relation with respect to the selected track or tracks of a magnetic record card and the energization of said magnetic head or heads with either input information to be recorded on the selected track or a select portion thereof or energizing information to permit the head or heads to reproduce signals previously recorded on the selected track or a selected portion or portions thereof.

In FIG. 3 is shown a modified form of the invention illustrated in FIGS. 1 and 2 wherein a flexible magnetic record card, such as the described floppy, parallel track record card, is fed along the upper surface 55 of a table 54 forming part of a mount 50A for rotationally supporting a cylindrical magnetic recording drum 56 containing an outer card supporting surface 56S. The card is guided downwardly around a curved portion 55C of the upper surface 55 by means of an elongated shaft or pin 56P extending between the end walls of the support 50a to dispose the card in an annular volume 55V between the outer surface 56S of the drum 56 and a cylindrical portion of the support 54 as illustrated. The card continues in its movement, being driven by a plurality of powered rollers 57 and 58 engaging such card against the upper surface 55 of the support 54 and additional rollers, three of which are illustrated and denoted 59A, 59B and 59C, as well as others which engage and drive the card against and around the outer surface 56S of drum 56. When fully deformed to its desired cylindrical or partially cylindrical configuration, the card may be magnetically recorded on and/or reproduced from by means of one or more magnetic transducers 32C, supported on a carriage 60 which is power driven along a track 61 supported at its ends adjacent the drum 56, wherein said transducing means is adapted to be normally coupled to the outer surface of the card or to engage or couple to same upon being projected outwardly from the carriage 60 against the selected track of the card. The carriage 60 and the track 61 are shown disposed between powered rollers 59A and 59B with the ends of the track being supported by respective end walls of the support 50A for the drum and table.

As in the embodiment illustrated in FIGS. 1 and 2, suction may also be employed to tightly pull the flexible magnetic card against the outer surface 56S of the drum 56 or the powered rollers may be employed to effect proper alignment and retainment of the flexible card against surface 56s to permit suitable magnetic transducing to be effected while the card is rotated with the drum and the transducer or transducers are properly aligned with a selected circular track of the card.

In FIGS. 4 and 5 is shown details of a modified form of magnetic transducing apparatus for recording on and/or reproducing from selected parallel tracks of a flexible of floppy magnetic card of the type described when the card is arcuately deformed into a partial cylindrical configuration, such as a semi-cylindrical configuration, so as to provide semi-cylindrical parallel record tracks capable of being scanned by one or more rotating transducers supported by a disc or drum which is rotated within the semi-cylindrical card configuration. As in the embodiments illustrated in FIGS. 1 and 2, the magnetic transducer or transducers are supported for radial movement from a retracted position to an extended position into engagement or coupling relation with the inside magnetic recording surface of a semi-cylindrically deformed magnetic record card while the card is held against a semi-cylindrical inside surface of an open housing. The transducing apparatus 61 includes a base or support 61S for supporting a mount 90 for a housing 89 containing respective means for power rotating and axially moving a hollow shaft 75 supporting a disc-shaped housing 65 at its end which housing 65 is rotatable within and just off the semi-cylindrical inside surface 62A of a semi-cylindrical housing 62. Housing 62 contains respective end walls, one of which 62B is illustrated in FIG. 4 and supports a bearing 64 within an axial bore 63 adapted to retain shaft 75 for axial movement through the housing 62 and axial rotation therein.

Supported adjacent the disc-shaped housing 65 is an elongated mount 80 or a magnetic reproduction transducer 81 which is employed to scan marker recordings extending across the parallel tracks of a magnetic record card, either along each track or between each track, so as to permit the selective scanning of a selected track by generating pulse signals which are applied to an electronic predetermining counter which, upon uncounting, indicates that the adjacent magnetic transducers are in alignment with the selected track.

A precision bearing, such as a needle or roller bearing 79, supports mount 80 on shaft 75 in a manner to permit rotation of such shaft therein without rotating mount 80 which is prevented from rotation by means of an axially movable shaft 82 which is supported for axial movement by means of a lineal bearing 86 supported by the end wall 62B of housing 62. Notation 77 refers to a cable extending through the hollow inside passageway 76 of shaft 77 from a source of electrical energy and information signals to the transducer or transducers 70T supported by the disc-shaped housing 65. Such transducer or transducers may be projected outwardly from the cylindrical peripheral surface 66 of housing 65 to engage or couple to a selected track of the semi-cylindrically deformed magnetic card and may be retracted beneath such surface 66 after efecting a transducing operation so as to prevent its engagement with the surface of the magnetic record card when not transducing. As in the embodiment of FIGS. 1 and 2, shaft 82 is also hollow and contains flexible cable or wires extending from the transducer 81 to a suitable amplifying, pulse shaping and electronic counting means.

Magnetic pickup 81 may be fixedly supported on its support 80 or projectable therefrom into engagement with the surface of a magnetic card during its axial movement across the card to permit it to pick up marker signals for selectively identifying selected tracks of a card.

Further details of the transducer and card driving menas are illustrated in FIG. 5. The peripheral wall 67 of the housing 65 contains a plurality of radial openings 69 through which openings respective magnetic transducers may be driven beyond the outer surface 66 into engagement with a semi-cylindrically deformed record card disposed against the semi-cylindrical surface 62A, a function which may be effected by mechanical or suction means of the type described. The housing 62 is shown as having a semi-cylindrical passageway 62B defining a header through which header may be applied vacuum pressure as described for applying suction to the inside surface of a magnetic record card which is drawn against the semi-cylindrical surface 62A when a drive wheel or drum 87 engages the card against the upper surface 62S of an inlet table or support forming part of the support for the housing 62. It is also noted that disc or drum 65 may also contain projectable friction means for engaging a flexible card which is driven into the annular volume 62V between the outer surface 66 of the peripheral wall of the disc-shaped housing 65 and the semi-cylindrical surface 62A of the housing 62. By driving disc-shaped housing 65 to the center of the semi-cylindrical housing 62 and causing its projectable engaging means[not shown] to engage the inside surface of the front end of a card inserted into volume 62V, and thereafter power rotating housing 65 in a proper direction, such means may be employed to drive the flexible or floppy magnetic card through the volume 62V until its front end or edge engages a stop 62T supported closely adjacent the surface 66 by either or both of the end walls of the housing 62.

As illustrated in FIG. 5, each transducer 70 is supported for radial movement through an opening 69 in the peripheral wall 67 of housing 65 and extends from a transducer base 82 which is supported within a cylindrical housing 84 which also supports a push-pull solenoid or powered lineal motor 83 connected to the transducer base 82 for projecting and retracting the transducer into and out of engagement with a semi-cylindrically deformed magnetic record card disposed against the semi-cylindrical surface 62A. The end of housing 84 is supported by means of a central inner cylindrical wall assembly 76 secured to the end of shaft 75. Notation 85 refers to a cable containing wires extending to power operate the solenoid or lineal motor 83 and to provide electrical energy for powering and properly operating the transducer 70.

Other features of the invention are noted as follows:

1. The support for the record card having a cylindrical or partial cylindrical inside surface, may be modified in external shape and may be configured and operable to rotate about a stationary support for one or more magnetic transducer of the type described which remain stationary as supported or are operable to be advanced by means of a solenoid or motor to engage the circularly deformed record card from a retracted position so as to effect a transducing operation with respect to a selected track of the card when engaging same and properly energized.

2. In place of the described magnetic transducing head or heads, one or more lasers may be operable to effect a reading or writing transducing function with respect to one or more tracks of a record card by replacement of the magnetic transducers with one or more lasers and, in the reproduction mode, providing one or more photoelectric detectors of the reflected laser light after it has intersected recordings which are electro-optically scannable and are provided along a selected track or tracks of the cylindrically deformed record card.

3. The drive means for the shaft 35 [FIGS. 1 and 2] and 75 [FIGS. 4 and 5] may comprise a respective rotary motor for rotating such shaft and the transducer assembly supported at its end and a lineal motor for moving the shaft and transducer assembly in a manner to cause the transducer or transducers of the latter to be driven into alignment with a selected track or tracks of a cylindrically deformed card disposed about the cylindrical support.

4. In another mode of operation, a magnetic record card containing recordings provided along a plurality of parallel record tracks, may be driven against a magnetic recording drum and suitable energy applied across the interface during the driving movement of the card and drum, to effect a transfer or print of the magnetic recordings of the card against the magnetic recording area of the drum. Thereafter, the magnetic recordings provided on parallel tracks of the drum may be selectively scanned and reproduced by means of one or more magnetic pickups supported by a carriage which is operable to travel a track extending parallel to the longitudinal surface or elemental surface of the magnetic recording drum. Selectively disposing the magnetic recording head or heads with one or more selected tracks of the drum may be effected by scanning marker recordings provided along a marker recording track of the drum at one end of the parallel record tracks thereof or normal to the parallel record tracks wherein such recordings are disposed between the record tracks along the length of the drum.

I claim:

1. Magnetic transducing apparatus for transducing information with respect to flexible magnetic record cards comprising in combination:

first means for supporting a flexible magnetic record card in an arcuate formation defining a portion of a cylinder with the inside surface of the arcuately formed card containing magnetic recording material, transducing means operable for magnetically transducing information with respect to selected of a plurality of parallel record tracks provided in the magnetic recording material of a flexible record card supported by said first means while said flexible record card is deformed into the shape of a partial cylinder and the parallel record tracks thereof form respective parallel interrupted circular track formations extending around the inside of said arcuate formation of said flexible record card, a support for supporting said transducing means within said arcuate formation of said record card and adjacent to but out of operable relation with respect to said record card supported by said first means, second means for effecting controlled powered rotary movement between said transducing means and said first means, third means for effecting powered lineal movement between said transducing means and said first means to bring said transducing means and a selected circularly extending track of an arcuately deformed card supported by said first means into scanning alignment so as to permit said transducing means to transduce information with respect to a selected track of said card, fourth means for effecting controlled relative movement in a radial direction between said transducing means and a cylindrically configured record card supported by said first means to cause said transducing means to be projected outwardly into operable relation with said selected track of said record card so as to permit said transducing means to transduce information with respect to said selected track of said card, fifth means for energizing said transducing means when operatively located with respect to said selected track of said card as said second means effects said controlled powered rotary movement between said transducing means and said first means, and sixth means for effecting controlled relative radial movement between said transducing means and said first means to cause said transducing means to be inwardly retracted from its operable relation with respect to said card when a transducing operation has been completed.

2. Magnetic transducing apparatus in accordance with claim 1 wherein said first means is a cylindrical drum like structure.

3. Magnetic transducing apparatus in accordance with claim 2 including means for power rotating said cylindrical drum-like structure.

4. Magnetic transducing apparatus in accordance with claim 1 wherein said first means contains a supporting surface for aligning and cylindrically deforming a record card which surface is a partial cylinder.

5. Magnetic transducing apparatus in accordance with claim 1 wherein said first means contains a substantially complete cylindrical surface for supporting a magnetic card there-against in a partial cylindrical configuration.

6. Magnetic transducing apparatus in accordance with claim 1 wherein said first means includes a support having a cylindrical inside surface for causing a flexible magnetic record card to conform to a partial cylindrical configuration.

7. Magnetic transducing apparatus in accordance with claim 1, wherein said first means includes a support having a partial cylindrical inside surface for supporting a portion of a flexible magnetic record card thereagainst in a partial cylindrical configuration.

8. Magnetic transducing apparatus in accordance with claim 6 wherein said second means is operable to power rotate said transducing means within said first means and said third means is operable to cause said transducing means to move radially outwardly within said first means from a retracted position into operable location with respect to a record card cylindrically deformed within said first means against said cylindrical inside surface.

9. Magnetic transducing apparatus in accordance with claim 6 wherein said transducing means is supported within said first means and said second means is operable to power rotate said first means around said transducing means.

10. Magnetic transducing apparatus in accordance with claim 1 including means for generating and applying negative pressure to said means for supporting a flexible magnetic record card to draw and retain a portion of said acrcuate card in a cylindrical configuration thereagainst.

11. Magnetic transducing apparatus for transducing information with respect to flexible magnetic record members, such as thin sheet-like record cards comprising:

a first support, first means supported by said first support for supporting and aligning a thin sheet magnetic record member having a plurality of closely spaced parallel record tracks in a partial cylindrical formation with the parallel recrod tracks of said record member being circularly shaped and defining a plurality of interrupted circular tracks, second means including a magnetic transducing means supported within said first means and means for effecting powered relative rotational movement between said transducing means and said first means, which movement is effected within a cylindrically deformed record card supported by said first means so as to permit said transducing means to scan circular record tracks of a magnetic record card deformed against said first means, which tracks extend around the inside of said record card, third means for power rotating said transducing means with respect to said first means to cause said transducing means to scan the circular record tracks of said card, fourth means for effecting and controlling relative longitudinal movement between said transducing means and said first means to cause said transducing means to be disposed in scanning alignment with a selected circular record track of a card supported and aligned by said first means, and fifth means for controlling the operation of said transducing means when operatively aligned with a selected track of a record card to cause said transducing means to transduce information with respect to said selected track of said card.

12. Magnetic transducing apparatus in accordance with claim 11 wherein said first means includes a support having a cylindrical inside surface portion for supporting and aligning a magnetic record card in a partial cylindrical configuration.

13. Magnetic transducing apparatus in accordance with claim 11 wherein said first means includes a hollow cylindrical support for conforming a flexible magnetic record card to define a partial cylindrical configuration.

14. Magnetic transducing apparatus in accordance with claim 11 including suction means for retaining flexible magnetic record members aligned against said first means.

15. A method of transducing information with respect to a magnetic record card comprising:

arcuately deforming at least a portion of a flat magnetic record card containing a plurality of closely spaced parallel record tracks and corresponding marker recordings defining the locations of said record tracks so as to provide such portion of said record card and the parallel record tracks thereof in partial cylindrical configuration defining a partial cylinder and cause said parallel record tracks to become configured in a plurality of parallel semicircular configurations, effecting controlled rotational movement of a first scanning transducer within said cylindrical configuration of said arcuately deformed card to permit said first transducer to scan selected semi-circularly configured tracks of said record card, and while said first transducer is rotating within the spacial volume defined by said partial cylindrically configured card, effecting relative axial movement between said first scanning transducer and said arcuately deformed record card and causing a second scanning transducer supported for axial movement with said first transducer to scan and detect said marker recordings and to generate marker signals when sensing said marker signals, employing said marker signals as feedback signals for indicating the location of said first transducer with respect to the parallel tracks of said card and generating a control signal when said first transducer attains scanning alignment with a selected of said parallel record tracks, employing said control signal to control the operation of said first transducer, when it is in scanning alignment with a selected track of said card, so as to cause said first transducer to transduce information with respect to said selected track, and when a transducing operation has been completed, predeterminately further controlling and effecting further relative movement between said record card and said first and second transducers.

16. A method in accordance with claim 15 including causing said first transducer to move from a retracted position away from said arcuately deformed portion of said card into engagement with a selected track of said card when said transducer is in scanning alignment with said selected track and effecting a transducing operation when such engagement is effected and, upon completing a transducing operation, causing said transducer to retract from the surface of said card.

17. A method in accordance with claim 16 wherein said transducer is operable to effect a magnetic recording, further including using said control signal to effect the generation of an information signal and applying said information signal to said recording transducer during the time it is in engagement with said selected track of said card to cause information defined by said information signal to be recorded along said selected track.

18. A method in accordance with claim 15 wherein said first transducer is a magnetic reproduction transducer, further including energizing said magnetic reproduction transducer during the time it is engaging said selected track of said card.

19. A method in accordance with claim 15 wherein said second scanning transducer is carried by said support and is driven in lineal movement thereon to cause it to scan a track containing said marker recordings while said first scanning transducer is rotated on said support in a manner to cause it to scan selected of said parallel tracks of an arcuately deformed portion of said card.

20. A method in accordance with claim 15 including generating a vacuum to cause said portion of said record member containing said plurality of closely spaced parallel record tracks and corresponding marker recordings to be arcuately deformed partial cylindrical configuration.

* * * * *